Dec. 1, 1970  G. C. NIXON  3,543,492
PORTABLE FRUIT PICKING APPARATUS
Filed Sept. 5, 1968  2 Sheets-Sheet 1
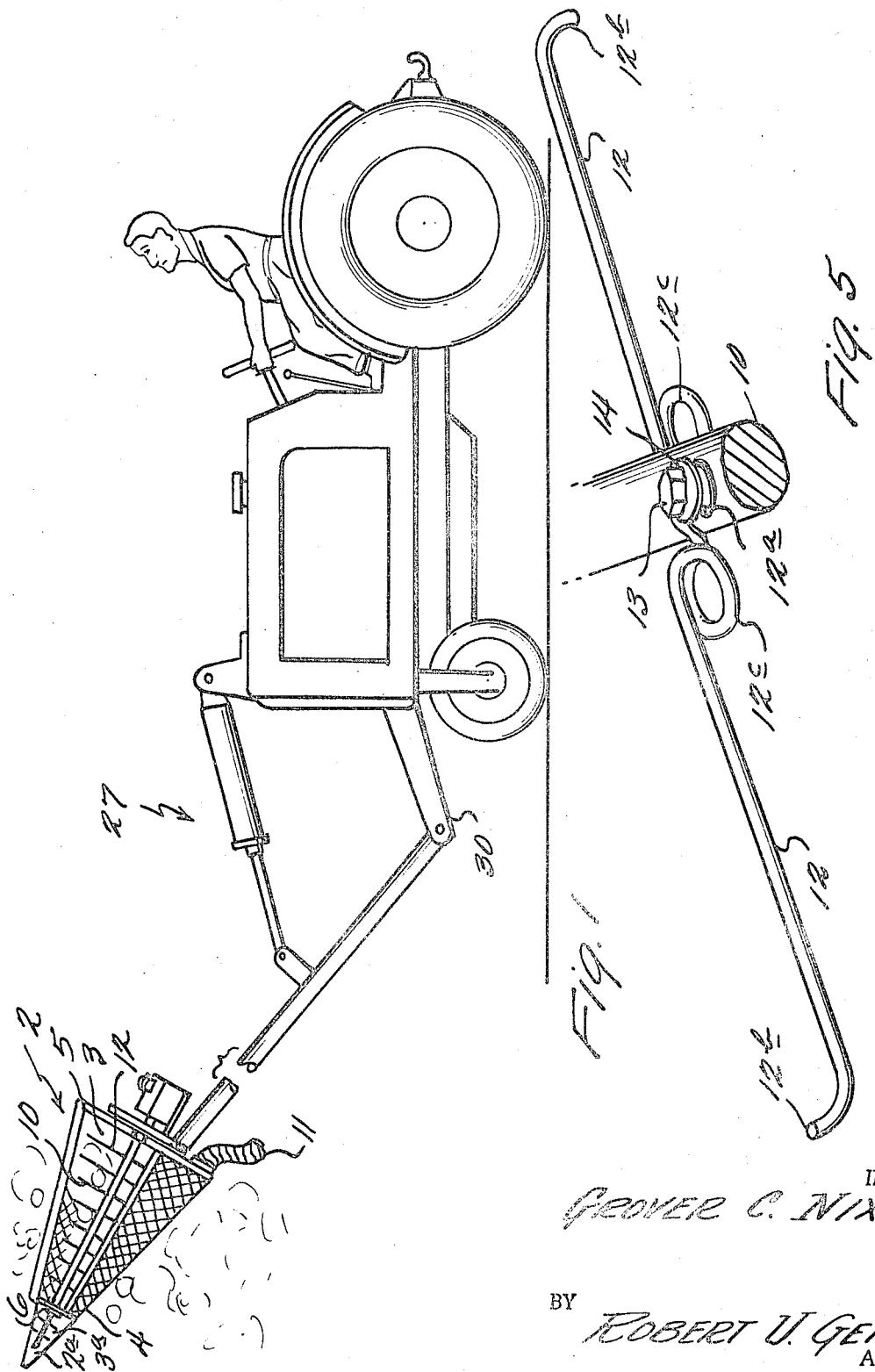
INVENTOR
Grover C. Nixon
BY Robert V. Geib, Jr.
ATTORNEY

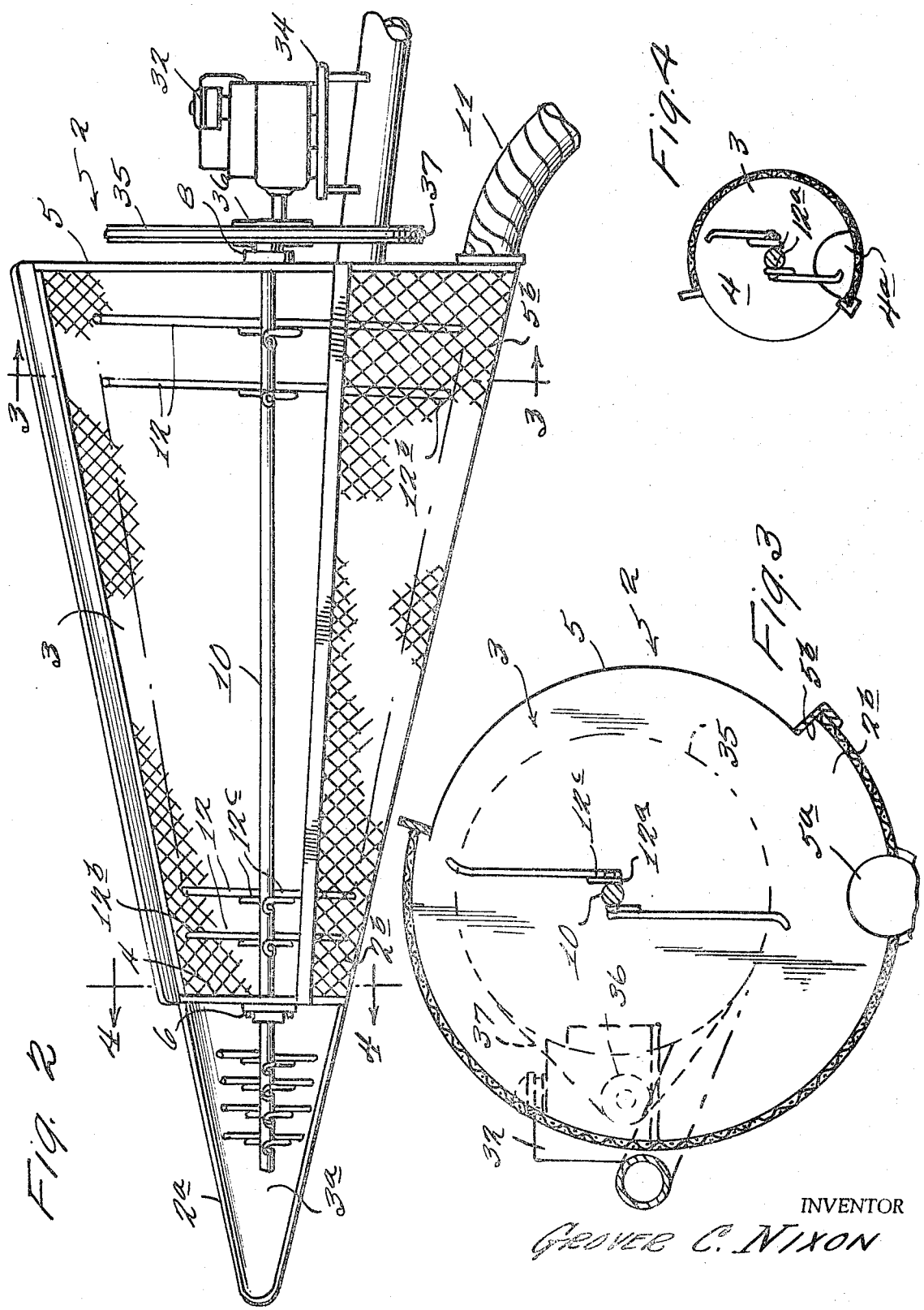

United States Patent Office 3,543,492
Patented Dec. 1, 1970

3,543,492
PORTABLE FRUIT PICKING APPARATUS
Grover C. Nixon, Rte. 2, Box 955,
Dover, Fla. 33527
Filed Sept. 5, 1968, Ser. No. 757,535
Int. Cl. A01g 19/08
U.S. Cl. 56—328                    7 Claims

ABSTRACT OF THE DISCLOSURE

A coniform basket having a large opening in its side for receiving substantial portions of a fruit-bearing tree or bush, including those which are adjacent the longitudinal axis thereof; a rotatable shaft axially disposed in said coniform basket; a series of flexible rodlike fruit-picking teeth secured at one end to said rotatable shaft and projecting outwardly therefrom into proximity with the adjacent portions of the inner surface of said coniform basket and becoming progressively longer in conformity with the tapering of the latter from the smaller to the larger end thereof; a closure member for the larger end of said coniform basket having an opening for the passage therethrough of the fruit which has been picked by said fruit-picking teeth as the same are activated by the rotation of said rotatable shaft.

---

This invention relates to a portable apparatus for the picking of fruits of various sizes and shapes from the trees or bushes on which they are grown, and particularly to oranges, although not limited thereto.

It is among the objects of the present invention to provide a portable fruit picking apparatus which may be conveniently carried by a tractor or other vehicle into close proximity to all portions of the tree or bush, the same being adopted for rapidly removing the fruit from its stems and without damage to the fruit.

Another object is the attainment of the foregoing objectives with an apparatus which may be easily and inexpensively manufactured, is deviable in service, and which may be operated by a single operator and from the driver's seat of a truck or other vehicle upon which it is mounted.

Additional objects and advantages will become apparent as this description proceeds, the same to be read in conjunction with the attached drawings in which like reference numerals designate like parts and wherein:

FIG. 1 is a diagrammatic elevational view illustrating the apparatus of the invention as mounted upon a conventional farm tractor;

FIG. 2 is an enlarged side elevational view of the picking basket and the instrumentalities associated therewith;

FIG. 3 is a transverse sectional view taken on the line 3—3 of FIG. 2;

FIG. 4 is a transverse sectional view taken on the line 4—4 of FIG. 2; and

FIG. 5 is an isometric view, partly in section, which illustrates the picking arms or fingers of the apparatus of the invention as mounted upon the rotatable shaft by which they are carried.

Referring more particularly to the drawings, the numeral 2 generally designates a basket or shell which is semi-conical in shape being open along one side thereof, as indicated at 3; said opening constituting more than one-third, and preferably one-half of its entirety.

In order to afford observation of the interior of the basket or shell 2 from the side thereof which is opposite the opening 3, it is preferably formed of expanded metal or metallic mesh.

A metallic closure plate 4 is disposed adjacent to, but spaced from the apex of the basket or shell 2; and a similar but larger metallic closure plate 5 is mounted at the bottom or larger end thereof.

Axially aligned shaft bearings 6 and 8 are fixedly carried by the metallic plates 4 and 5, respectively, and between them support a rotatable shaft 10.

As will be observed, the outer end of the rotatable shaft 10 projects outwardly from the shaft bearing 6 and is partially shrouded by a semi-conical sheet metal cap 2a having an opening 3a in the manner of the opening 3 of the basket or shell 2.

The smaller and outer closure plate 4 has a peripheral opening 4a (see FIG. 4) of a size which permits the passage therethrough of the fruit to be picked, and a similar peripheral opening 5a (see FIG. 3) is provided in the closure plate 5 for the same purpose.

According to a satisfactory embodiment, at the base of the coniform basket 2 and at or adjacent the center of the solid portion thereof (as distinguished from the middle of the immediately opposite large opening 3) the coniform basket 2 and the immediately adjacent portion of the end closure 5 are provided with off-set corresponding extensions 2b and 5b (see FIG. 2) which form a trough along which the fruit moves by gravity to and through the opening 5a and down a flexible tube 11 and onto an endless conveyor by means of which it is moved to a suitable bin or receptacle.

If desired, guide rails (not shown) may be employed to assist the slow gravitational movement of the picked fruit along the trough formed by the off-set or out-of-round portions 2b and 5b respectively of the sidewall of the coniform basket 2 and the end closure 5.

The rotatable shaft 10 forms a carrier or hub for a series of flexible rod-like fruit-picking teeth or fingers 12 which are secured thereto at their inner ends and extend outwardly into proximity with the inner surface of the coniform basket 2, being progressively longer from the smaller end of the basket to the larger end thereof.

As shown, the fruit-picking teeth or fingers extend from the rotatable shaft 10 in two oppositely disposed banks.

More specifically, each of the flexible rod-like fruit-picking fingers 12 is provided at its inner end with a small loop or eyelet 12a for receiving a bolt or machine screw 13 which connects it to the rotatable shaft 10 which is tapped to receive the same; a common washer 14 being provided for disposition between the eyelet and the underside of the head of the bolt in the usual manner.

According to a preferred embodiment, the flexible rod-like fruit-picking fingers 12 are so attached to the rotatable shaft 10 as to extend tangentially rather than radially therefrom and at an angle of approximately 90° with respect to the axis thereof.

Also to be noted is that the outer extremities 12b of the flexible rod-like fruit-picking fingers 12 are bent to extend for a short distance at an angle of approximately 45° with, and in a direction which is opposite or trailing with respect to, the direction of rotation of the rotatable shaft 10.

Another important feature is the bending of a portion of the length of the rod-like fingers 12 adjacent their inner ends into a complete convolution or loop, as shown at 12c.

Depending upon the strength afforded by the dimensions of the flexible rod-like fruit-picking fingers 12, the material of which they are made, and the nature of the fruit to be picked, it may be advantageous to substitute a partial or complete loop for the previously described angular extremity 12b. Also a double convolution or loop in lieu of the single one shown at 12c.

In either event, the outer extremity 12b and the intermediately disposed convolution(s) 12c should be so formed as to occupy a common plane and one which is at an approximate 90° angle with respect to a plane occupied by the small loop or eyelet 12a by means of which the rod-like finger 12 is attached to the rotatable shaft 10.

As earlier stated, the coniform basket 2 and the elements associated therewith may be mounted on a tractor or other vehicle and conveniently moved thereby into operative relationship with respect to the fruit-bearing trees or bushes.

In the illustrative embodiments the portable picking apparatus is shown as mounted on a garden tractor having the usual pivotally mounted hydraulic boom 27 and pivotally mounted hydraulic boom support 30; whereby the outer end of the hydraulic boom may be moved telescopically and rotationally, and also upwardly and downwardly through the medium of the hydraulic boom support 30.

The controls for the hydraulic boom 27 and boom support 30 are customarily disposed where they are easily and quickly accessible to the operator of the tractor.

According to the foregoing construction and arrangement the flexible rod-like fruit-picking fingers 12 may be readily brought into operative contact with practically any portion of the fruit-bearing tree or bush from ground level to heights of 30 feet or more.

The rotary shaft 10 which carries the the picking fingers 12 may be rotated either clockwise or counter-clockwise; and when the coniform basket 2 is raised upwardly along the contour of the fruit-bearing tree the outer ends of the picking fingers 12 on the rotatable shaft 10 gently engage the fruit and just as gently separates it from its stem immediately following which the picked fruit gently falls by gravity behind the picking fingers onto the adjacent portion of the inner surface of the coniform basket, and rolls along the trough formed by its off-set portions 2b and 5b through the peripheral discharge opening 5a in the end closure plate 5 and down the communicating flexible tube 11 to the endless conveyor or other conveniently disposed fruit handling facility.

The means for rotating the rotatable shaft 10 on which the flexible rod-like fruit-picking fingers 12 are mounted may take any one of a number of convenient and wholly conventional forms.

However, it has been found very practicable to drive it from a small and light-weight air cooled internal combustion engine 32 mounted on a conveniently disposed platform 34 which is secured to the outer portion of the hydraulic boom; said engine 32 and the adjacent portion of the rotatable shaft 10 being provided with grooved pulleys 35 and 36 respectively, which are connected by a flexible endless V-belt 37.

Having thus described the invention what I claim as new and desire to secure by Letters Patent is:

1. A portable fruit picking apparatus adapted to be mounted on a tractor or other vehicle comprising
   a coniform basket having an opening in its wall for simultaneously receiving substantial quantities of fruit and their stems together with the immediately adjacent portions of the branches by which they are carried;
   a fixedly mounted shaft bearing disposed at the longitudinal center-line of said coniform basket and adjacent the smaller end thereof;
   a fixedly mounted shaft bearing disposed at the longitudinal center-line of said coniform basket and adjacent the larger end thereof;
   a rotatable shaft journaled in said shaft bearings;
   means for driving said rotatable shaft;
   a series of flexible rod-like fruit-picking teeth secured at one end to said rotatable shaft and projecting outwardly therefrom into proximity with the adjacent portion of the inner surface of said coniform basket and becoming progressively longer in conformity with the tapering of said coniform basket from the smaller to the larger end thereof;
   a closure member adjacent the larger end of said coniform basket;
   said closure member having an opening for the passage of picked fruit therethrough;
   means within said coniform basket for guiding the gravity movement of picked fruit to the opening in said closure member; and
   means communicating with the opening in said closure member for collecting the picked fruit.

2. The apparatus of claim 1 wherein the flexible rod-like fruit-picking teeth extend tangentially from said rotatable shaft and at substantial right-angles; with respect to the axis of said rotatable shaft.

3. The apparatus of claim 1 wherein the flexible rod-like fruit-picking teeth are bent to form at least one complete convolution at a position which is more closely adjacent said rotatable shaft than the inner surface of said coniform basket.

4. The apparatus of claim 1 wherein the flexible rod-like fruit-picking teeth are bent to form at least one complete convolution at a position which is more closely adjacent said rotatable shaft than the inner surface of said coniform basket and which extends tangentially from said rotatable shaft and at substantial right-angles, with respect to the axis of said rotatable shaft.

5. The apparatus of claim 1 wherein the wall of the coniform basket is provided with a longitudinally extending off-set portion forming a trough on the interior thereof; said closure member having an off-set portion in registration with the longitudinally extending off-set portion of the coniform basket; the off-set portion of said closure member having an opening therein for the discharge of picked fruit.

6. The apparatus of claim 1 wherein the flexible rod-like fruit-picking teeth extend tangentially from said rotatable shaft and at substantial right-angles with respect to the axis of said rotatable shaft, said flexible rod-like fruit-picking teeth being arranged in two oppositely disposed banks.

7. A portable fruit picking mechanism comprising a power driven rotary comb-like member having flexible teeth arranged to engage the fruit or clusters thereof and strip the same from their stems; said comb-like member including a shaft fixedly mounted within bearings which are mounted adjacent two end walls; one end of each of said flexible teeth being attached to said shaft; power means for rotating said shaft; said flexible teeth between the ends thereof being bent to form one or more turns of a coil to increase the flexibility thereof; and a member disposed beneath said rotary comb-like member for receiving the fruit after it has been stripped from its stems and conducting it to a receptacle therefor.

References Cited
UNITED STATES PATENTS

| | | | |
|---|---|---|---|
| 3,404,521 | 10/1968 | Thorn et al. | 56—328 |
| 3,448,567 | 6/1969 | McGee | 56—328 |

LOUIS G. MANCENE, Primary Examiner

J. N. ESKOVITZ, Assistant Examiner